US012312746B2

(12) United States Patent
Föll et al.

(10) Patent No.: US 12,312,746 B2
(45) Date of Patent: May 27, 2025

(54) COATED PAPER

(71) Applicant: KOEHLER INNOVATION & TECHNOLOGY GMBH, Oberkirch (DE)

(72) Inventors: Aljoscha Föll, Appenweier (DE); Claus Jurisch, Offenburg (DE); Christian Kind, Baden-Baden (DE); Marius Schulte, Oberkirch (DE); Thomas Serrer, Appenweier (DE); Andrew Vogt, Offenburg (DE)

(73) Assignee: Koehler Innovation & Technology GmbH, Oberkirch (DE)

( * ) Notice: Subject to any disclaimer, the term of this patent is extended or adjusted under 35 U.S.C. 154(b) by 179 days.

(21) Appl. No.: 17/791,160

(22) PCT Filed: Oct. 14, 2021

(86) PCT No.: PCT/EP2021/078468
§ 371 (c)(1),
(2) Date: Jul. 6, 2022

(87) PCT Pub. No.: WO2022/079178
PCT Pub. Date: Apr. 21, 2022

(65) Prior Publication Data
US 2023/0039088 A1    Feb. 9, 2023

(30) Foreign Application Priority Data

Oct. 16, 2020   (DE) .................. 10 2020 127 373.8

(51) Int. Cl.
| | | |
|---|---|---|
| *D21H 19/82* | (2006.01) | |
| *B65D 65/42* | (2006.01) | |
| *D21H 11/00* | (2006.01) | |
| *D21H 19/12* | (2006.01) | |
| *D21H 19/38* | (2006.01) | |
| *D21H 19/40* | (2006.01) | |
| *D21H 19/58* | (2006.01) | |
| *D21H 19/60* | (2006.01) | |
| *D21H 23/48* | (2006.01) | |
| *D21H 27/10* | (2006.01) | |

(52) U.S. Cl.
CPC .......... *D21H 19/826* (2013.01); *B65D 65/42* (2013.01); *D21H 11/00* (2013.01); *D21H 19/12* (2013.01); *D21H 19/385* (2013.01); *D21H 19/40* (2013.01); *D21H 19/58* (2013.01); *D21H 19/60* (2013.01); *D21H 23/48* (2013.01); *D21H 27/10* (2013.01)

(58) Field of Classification Search
CPC ...... D21H 19/826; D21H 11/00; D21H 19/12; D21H 19/385; D21H 19/40; D21H 19/58; D21H 19/60; D21H 23/48; D21H 27/10; D21H 19/20; D21H 19/82; B65D 65/42; B32B 29/002; B32B 2255/12
See application file for complete search history.

(56) References Cited

U.S. PATENT DOCUMENTS

| | | | |
|---|---|---|---|
| 6,444,750 B1 | 9/2002 | Touhsaent | |
| 10,040,614 B2 | 8/2018 | Zischka et al. | |
| 2006/0078700 A1* | 4/2006 | Bletsos | B65D 75/30 |
| | | | 428/36.1 |
| 2008/0085831 A1* | 4/2008 | Kawamura | B41M 5/44 |
| | | | 503/227 |
| 2016/0017166 A1 | 1/2016 | Zischka et al. | |
| 2017/0350074 A1* | 12/2017 | Kinast | D21H 19/46 |

FOREIGN PATENT DOCUMENTS

| | | |
|---|---|---|
| CN | 105408223 A | 3/2016 |
| CN | 110770397 A | 2/2020 |
| DE | 102022109277 A1 | 10/2023 |
| EP | 1747898 A1 | 1/2007 |
| EP | 2777934 A1 | 9/2014 |
| EP | 3838588 A1 | 6/2021 |
| JP | 06227159 A | 8/1994 |
| JP | 2009249575 A | 9/1997 |
| JP | 2001294832 A | 10/2001 |
| JP | 2005096109 A | 4/2005 |
| JP | 4432966 B2 | 3/2010 |
| JP | 2013169988 A | 9/2013 |
| JP | 2015021200 A | 2/2015 |
| WO | 2010129032 A1 | 11/2010 |
| WO | 2013069788 A1 | 5/2013 |
| WO | 2020109401 A1 | 6/2020 |
| WO | 2020109403 A1 | 6/2020 |
| WO | 2020116514 A1 | 6/2020 |

(Continued)

OTHER PUBLICATIONS

International Search Report for Application No. PCT/EP2021/078468, Dated Jan. 28, 2022.
Kuraray Poval, Exceval & Elvanol Resins Technical Data Sheet; Kuraray America, Inc; 10 pages.
Wikipedia Page for Polyvinyl alcohol; Wikipedia; https://en.wikipedia.org/w/index.php?title=Polyvinyl_alcohol&oldid=935585056; Accessed Apr. 5, 2023; 3 pages.
Third Party Observation of European Patent Application No. 21794510.4, dated Apr. 13, 2023, 12 pages.
Office Action for European Patent Application No. 21794510.4, dated Apr. 9, 2024, 5 pages.
Third Party Observation of European Patent Application No. 21794510.4, dated Sep. 23, 2022, 7 pages.

(Continued)

*Primary Examiner* — Dennis R Cordray
*Assistant Examiner* — Matthew M Eslami
(74) *Attorney, Agent, or Firm* — Lippes Mathias LLP

(57) ABSTRACT

The present invention relates to a coated paper comprising a base paper and a barrier layer applied thereto, the barrier layer comprising at least one polymer, the polymer comprising an at least partly saponified polyvinyl alcohol and/or an at least partly saponified polyvinyl alcohol copolymer, each of which has an onset temperature of less than 210° C. determined by DSC.

18 Claims, No Drawings

(56) References Cited

FOREIGN PATENT DOCUMENTS

| WO | 2021038130 A1 | 3/2021 |
| WO | 2021255326 A1 | 12/2021 |

OTHER PUBLICATIONS

Office Action for European Patent Application No. 21794510.4, dated Jun. 20, 2023, 7 pages.
Third Party Observation of European Patent Application No. 21794510.4, dated Aug. 25, 2023, 5 pages.
Neira-Velazquez, Maria Guadalupe et al.; Polymer Molecular Weight Measurement; Handbook of Polymer Synthesis, Characterization and Processing; First Edition; 2013; 12 pages.
Nagy, D.J. et al.; "Sec of Poly(Vinyl Alcohols) Using Multi-Detection Methods"; GPC Symposium 1991; 19 pages.
Cleaver, Graham; "Characterizing Polyvinyl Alcohol by SEC"; Agilent Technologies, Inc.; Apr. 30, 2015; 2 pages.
Decision of the Technical Board of Appeal on Case No. T 04466/05-3.3.03, dated Dec. 19, 2006, 45 pages.
Third Party Observation of European Patent Application No. 21794510.4, dated Mar. 28, 2024, 17 pages.
Office Action for Chinese Patent Application No. 202180007653, dated Oct. 28, 2023, 16 pages.
Kumaki, Yosuke et al.; "Enhanced Polyvinyl Alcohol as a Barrier Paper Coating for Food Packaging"; TAPPI PaperCon 2014 Conference Proceedings; 2014; 13 pages.
Office Action for Japanese Patent Application No. 2022549690, Dated Jul. 10, 2023, 9 pages.
Kuraray Co., Ltd.; Kuraray Poval Here to Innovate; Sep. 2014.
Office Action for Japanese Patent Application No. 2022549690, dated Jan. 10, 2024, 11 pages.
Sigma-Aldrich Technical Data Sheet Mowiol 10-98; Version 6.2; Aug. 22, 2022; 7 pages.
Sigma-Aldrich Technical Data Sheet Mowiol 20-98; Version 3.8; Jul. 27, 2017; 7 pages.
User Communication Thermal Analysis Information for Users; Mettler-Toledo GmbH, Analytical; Feb. 2016; 28 pages.
"Investigation of Polymers with Differential Scanning Calorimetry"; Humboldt Universitat Zu Berlin; Advanced Lab: DSC Investigation of Polymers; Jul. 5, 2016; 18 pages.
Third Party Observations for PCT/EP2021/078468, dated Apr. 20, 2023, 10 pages.
Third Party Observations for European Patent No. 21794510.4, dated Oct. 23, 2024, 7 pages.
DSC Thermogram of Kuraray PVOH, labeled D14a (Oct. 12, 2023) and D14b (Sep. 26, 2023).
Office Action for Korean Patent Application No. 10-2022-7025342, dated Aug. 2, 2024, 19 pages.
KurarayTechnical Data Sheet Kuraray Poval; Jul. 2014; 4 pages.
"Basic Physical Properties of PVOH Resin"; Kuraray; Dec. 2020; 40 pages.
ISO 11357-1:2016; Plastics—Differential scanning calorimetry (DSC); Edition 3; 2016; 2 pages.

* cited by examiner

COATED PAPER

The present invention relates to a coated paper, to a method for producing such a coated paper, to the use of the coated paper as a packaging material, and to a packaging comprising the coated paper.

The term "packaging" generally refers to the covering or (partial or complete) wrapping of an object, especially for its protection or for better handling. Consequently, a packaging material comprises the material forming such packaging.

Packaging materials can, for example, be based on paper, plastics and/or metals. The present invention is concerned with packaging materials based on paper.

The main requirements of packaging materials of any origin are to protect the packaged product from external influences and to prevent the packaged product from escaping. For this purpose, the packaging material should fulfil different criteria depending on the packaged product and the packaging process. In addition to so-called barrier properties against water, grease, oxygen or mineral oil for example, suitable packaging materials should also meet mechanical and process-specific requirements. Depending on the packaging system, a packaging material should have sufficient tear resistance, a suitable friction value (coefficient of friction) and flexibility, it should either be heat-sealable or compatible with a cold seal adhesive, it should be printable from the outside and it should not lose its protective effect during the entire conversion and packaging process.

Depending on its composition and area density, paper can meet many mechanical requirements, but due to its physical properties, as well as its porous structure, it needs an additional coating that provides it with, for example, heat sealability or barriers.

Known paper-based, coated packaging materials often contain compounds such as polyvinylidene chloride (containing halogens), or are composites of paper and metal foils or plastic films, have tear strength that needs improvement, which can lead to running problems on packaging equipment, and/or are often not recyclable due to too high a coating content, adhesive constituents or formation of so-called stickies via the paper fibre stream.

Polyvinyl alcohols are widely known as linear water-soluble, biodegradable barrier coatings, including for paper. Here, such coatings exhibit good barriers against oil, grease, oxygen, solvents and other non-polar gases, liquids or solids. However, due to their hydrophilicity, polyvinyl alcohols have very high permeabilities for polar compounds, such as water. This can also influence the barrier effect against non-polar migrants, as polyvinyl alcohols are very good at absorbing moisture, at swelling, and thus at creating pathways at molecular level through the barrier coating.

There have been many attempts made to achieve barrier degradation at relative humidities above 50 or 60% by, for example, the addition of pigments, as disclosed for example in WO 2010/129032, or by cross-linking of the polymer chains, as disclosed for example in WO 2020/109401 or U.S. Pat. No. 6,444,750. However, not only are these microscopic defects disadvantageous for the use of polyvinyl alcohols as barriers, but also and above all the occurrence of macroscopic defects due to the mechanical stress in packaging and converting systems impair the scope of use of polyvinyl alcohols.

Polyvinyl alcohol is understood to mean a completely saponified polyvinyl acetate, this being a (thermoplastic) plastics material of the following formula (I), which is usually synthesised by means of free-radical polymerisation of vinyl acetate.

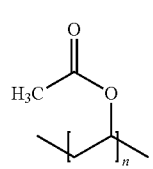

(I)

The ester groups in polyvinyl acetate can be alkaline saponified relatively easily, which converts the polymer into polyvinyl alcohol, making it hydrophilic and water-sensitive.

A partly saponified polyvinyl acetate is also called partly saponified polyvinyl alcohol.

In the present invention, the term "partly saponified polyvinyl acetate" may be used synonymously with the term "partly saponified polyvinyl alcohol".

The degree of saponification in this case indicates the proportion of ester groups that have been saponified and are now present as —OH groups. For example, a polyvinyl alcohol with a degree of saponification of 90% is a vinyl acetate polymer in which 90% of the ester groups originally present have been saponified. Therefore, 90% OH groups and 10% ester groups are present in this polyvinyl alcohol. With a degree of saponification of 100%, only OH groups are present, since all the ester groups originally present have been saponified.

In addition to the pure homopolymer, many copolymers of polyvinyl alcohol are also of great technical importance. Copolymer is understood to mean all polymers that consist in a predominant proportion (>50%) of vinyl alcohol or vinyl acetate units, regardless of the number of different monomers used for synthesis.

Such polyvinyl alcohol copolymers preferably comprise polyethylene vinyl alcohols.

In the narrower sense, saponification here means the hydrolysis of an ester by the aqueous solution of a hydroxide, such as sodium hydroxide, or by special enzymes (esterases). In contrast to acid ester hydrolysis (the reverse reaction of esterification), they are irreversible, since the proton necessary for esterification is missing on the carboxylic acid. The created products of the reaction are the alcohol and the salt of the acid (carboxylation) of which the ester consisted. In a broader sense, any hydrolysis of an ester can be referred to as saponification.

The aim of the present invention is to overcome the disadvantages of the known materials and to provide a material which is suitable as a packaging material, especially for oxidation-sensitive and greasy foods, and which can be used for the production of packaging, such as tubular bags, by means of heat sealing or cold sealing processes. In addition, the material is not intended to contain any barrier layers based on halogen-containing compounds. Furthermore, the material according to the invention shall have one or more of the following properties compared to known packaging materials:

improved oxygen barrier, improved grease barrier, improved mineral oil barrier, improved crease resistance/flexibility, recyclability via the waste paper cycle, improved heat sealing properties, improved cold sealing properties (compatible with the sealing medium, such as a water-based cold seal adhesive), high tear resistance, the taste of the packaged content is not changed, has an aroma seal, the outside should be printable. The material should also have an improved water vapour barrier and the sealing seam should be as resistant to moisture as possible. The packaging material should also be suitable for metallisation, especially in the micro- and nanometre range, in order to further optimise the barrier properties if required. Lastly, the material should be producible as economically as possible.

This aim is addressed by a coated paper according to claim 1, i.e. by a coated paper comprising a base paper and a barrier layer applied thereto, the barrier layer comprising at least one polymer and being characterised in that the polymer comprises an at least partly saponified polyvinyl alcohol and/or an at least partly saponified polyvinyl alcohol copolymer, each of which has an onset temperature of less than 210° C. determined by DSC.

The onset temperature was determined by DSC as follows:

The (extrapolated) onset temperature (according to DIN EN ISO 11357-1:2010-03) is the point of intersection of the extrapolated baseline and the inflection tangent at the beginning of the melting or crystallisation peak in a DSC measurement. The baseline and the inflection tangent are determined from the temperature-dependent heat flow signal. For pure and homogeneous materials, the initial temperature can be specified as the melting temperature. In contrast to the peak temperature, the onset temperature is less dependent on the heating rate and the sample mass. Furthermore, onset temperatures are commonly used for temperature calibration of a DSC.

A paper coated in this way is distinguished especially in that it is especially suitable as a packaging material for oxidation-sensitive and greasy objects, especially foodstuffs, and can be used to produce bags by means of heat or cold sealing, it being possible to use a water-based cold seal adhesive for the cold sealing process. Furthermore, no barrier layers based on halogen-containing compounds need to be present.

Partly saponified polyvinyl alcohols have the advantage over fully saponified polyvinyl alcohols (PVOH) or polyethylene vinyl alcohols (EVOH) that they have a much lower optimum sealing temperature in the heat sealing process. The sealing seam strength is not negatively influenced by this. Furthermore, partly saponified polyvinyl alcohols have a slightly lower viscosity, with otherwise the same concentration. A high viscosity is rather disadvantageous, because in this case the PVOH solution has to be diluted to a greater extent, and therefore a larger amount of water has to be dried in the coating process. This not only costs in terms of energy and thus requires a coating facility with a higher drying capacity, but can also be difficult to realise in terms of application technology, depending on the desired coating weight. In addition, the diffusion of water molecules at high viscosities and thus the drying process itself is slowed. Furthermore, the accumulation of gaseous water in the coating may be more likely, leading to the formation of macroscopic coating defects.

Therefore, partly saponified polyvinyl alcohols or partly saponified polyvinyl alcohol copolymers, such as polyethylene vinyl alcohols, are preferred over the fully saponified variants.

The coated paper according to the invention is also distinguished by an improved oxygen barrier, an improved grease barrier, an improved mineral oil barrier and an improved water vapour barrier.

The coated paper according to the invention also has improved crease resistance, without impairing the barrier effect, and is also distinguished by a high tear strength.

The coated paper according to the invention is also recyclable via the waste paper cycle.

If the coated paper according to the invention is used as a packaging material for foodstuffs, it is distinguished especially in that it does not influence and/or change the taste of the packaged foodstuff.

The coated paper according to the invention is additionally heat sealable and exhibits improved cold sealing properties (compatible with the sealing medium, such as a water-based cold seal adhesive), with the sealing seams each having sufficient moisture resistance.

The coated paper according to the invention is also easy to print on the uncoated side (outer side).

The coated paper according to the invention is also suitable for metallisation in the micro- and nanometre range to further optimise the barrier properties if required.

Lastly, the coated paper according to the invention can be produced relatively easily and with low coating weights and can be recycled via the waste paper cycle.

In the following, the term "comprise" may also mean "consisting of".

The term "hydrophobic" refers to substances that cannot be mixed with water or can only be wetted by water with the use of surfactants. The term "hydrophilic" refers to substances that can be mixed with water or that can be wetted by water without the use of surfactants. Hydrophobic polymers are also referred to as non-polar polymers and hydrophilic polymers are also referred to as polar polymers.

Hydrophobicity or hydrophilicity can be defined, for example, via the log P value. The n-octanol/water partition coefficient K. (notations such as octanol/water partition coefficient are also common and correct) is a dimensionless partition coefficient known to a person skilled in the art which indicates the ratio of the concentrations of a chemical in a two-phase system formed of n-octanol and water and is thus a measure of the hydrophobicity or hydrophilicity of a substance. The log P value is the decadic logarithm of the n-octanol-water partition coefficient $K_{ow}$. The following is true here:

$$K_{ow} = P = \frac{c_0^{Si}}{c_w^{Si}} \text{ and } \log P = \log \frac{c_0^{Si}}{c_w^{Si}} = \log c_0^{Si} - c_w^{Si}$$

where $c_o{}^{si}$=concentration of a chemical in the octanol-rich phase and $c_w{}^{si}$=concentration of a chemical in the water-rich phase.

$K_{ow}$ is greater than one if a substance is more soluble in fat-like solvents, such as n-octanol, and less than one if it is more soluble in water. Accordingly, log P is positive for hydrophobic/lipophilic substances and negative for hydrophilic/lipophobic substances.

The low permeability of polyvinyl alcohols to oxygen, mineral oil, fat and other non-polar migrants is due to their relatively high hydrophilicity.

In addition, ethylene-containing polymers, such as (saponified) polyethylene vinyl alcohols, have a lower water vapour permeability, which can be attributed to the ethylene content and the associated lower hydrophilicity.

The base paper used in the coated paper according to the invention is not limited in principle.

However, it is preferred that the base paper has an area density of 20 to 120 g/m², preferably 40 to 100 g/m².

It is further preferred that the paper has a composition with a long fibre content of from 10 to 80%, preferably from 20 to 50%, and a short fibre content of from 20 to 90% by weight, preferably from 50 to 80% by weight.

A long fibre is understood to mean a fibre with a fibre length of from 2.6 to 4.4 mm and a short fibre is understood to mean a fibre with a fibre length of from 0.7 to 2.2 mm.

In addition, 0% to 20%, preferably 0% to 5% of fillers, the value 0% being preferably excluded, such as GCC (ground calcium carbonate), known for example under the trade name Hydrocarb 60 or Hydroplex 60, PCC (precipitated calcium carbonate), known for example under the trade name Precarb 105, natural kaolin and/or talc, as well as usual auxiliaries, such as retention agents and/or sizing agents, can be contained.

The advantage of such a base paper is, on the one hand, its high flexibility and, on the other hand, its good processability in existing packaging machines for flexible materials, such as plastics material films, the maintenance of high machine availability, and the achievement of the necessary puncture resistance.

Common packaging machines are, for example, vertical and horizontal form fill and seal machines for the production of stand-up pouches, flowpacks, pillowpacks, and others, machines that bring together two webs of the same or different materials and join them by heat sealing, for example also tray sealers, chamber belt machines (also with vacuum), bag filling and sealing machines, thermoforming packaging machines, linear filling machines that apply lids by heat sealing to seal the packaging, wrapping machines with final heat sealing step, blister packaging machines, and X-fold packaging machines.

The coated paper according to the invention is further preferably characterised in that a precoat comprising at least one inorganic pigment and a polymeric binder is present between the base paper and the barrier layer.

The inorganic pigment is preferably in the form of platelets and comprises especially a talc, precipitated calcium carbonate or silicates, preferably phyllosilicates and very especially preferably a kaolin.

Suitable polymeric binders include, especially, acrylate-based or styrene/butadiene-based binders. In principle, all polymers that can be used as binders for pigment coatings in the paper industry are suitable. Starch-based binders (solutions of modified starches, dispersions of cross-linked starches, so-called biolatexes) and polymer-starch hybrid latices are also possible.

The polymeric binder preferably comprises a polymeric binder based on a polyacrylate.

The precoat may be a hydrophobic precoat on the whole.

In another embodiment, the precoat is hydrophilic on the whole.

The precoat preferably contains 1 to 70% by weight, preferably 5 to 50% by weight, of polymeric binder. The amount relates to the dried precoat in the final product.

The precoat further preferably contains 50 to 95% by weight, preferably 80 to 90% by weight, of inorganic pigment. The amount relates to the dried precoat in the final product.

In addition, the precoat may contain additives such as thickeners, for example acrylate-based thickeners, surfactants, and/or rheology modifiers. The use of cross-linking agents is also conceivable. Preferably, the precoat contains a zirconium-based cross-linking agent and is itself cross-linked with formaldehyde.

These additives are preferably each present in an amount of from 0 to 2% by weight, preferably greater than 0 to 2% by weight, the value 0% being preferably excluded. The amount relates to the dried precoat in the final product.

The applied amount of the precoat is preferably 1 to 10 $g/m^2$ and especially preferably 2 to 6 $g/m^2$. The amount relates to the dried precoat in the final product.

If such a precoat (also called a primer) is applied, this has the advantage for example that the paper surface is sealed and the further barrier layer coated on top of it migrates only slightly into the paper, thus creating sufficient ply adhesion. Furthermore, this precoat reduces the average roughness depth of the base paper and offers an advantageous "holdout", which is distinguished by an application covering the entire surface and by a defined surface energy, so that an applied barrier layer can form optimally. In addition, the precoat mediates the ply adhesion between the base paper and the barrier layer, which may be important for subsequent sealing applications.

The barrier layer applied to the precoat comprises an at least partly saponified polyvinyl alcohol and/or an at least partly saponified polyvinyl alcohol copolymer. The formulation used for the processing process preferably comprises an amount of from 10 to 100% by weight, especially preferably from 50 to 99.8% by weight, of polymer.

The barrier layer may further contain additives, such as thickeners, for example acrylate-based thickeners, surfactants, for example sulfosuccinates, stretch rheology aids, for example polyacrylamides, carboxymethyl cellulose, polyvinyl alcohols, and/or cross-linking agents, such as aldehydes and polyvalent aldehydes, zirconates, polyvalent epoxides, epichlorohydrin resins and/or hydrazides.

These additives are preferably each contained in an amount of from 0.1 to 1% by weight, in relation to the total weight of the barrier layer.

In one embodiment, the coated paper according to the invention is further preferably characterised in that the at least partly saponified polyvinyl alcohol and/or the at least partly saponified polyvinyl alcohol copolymer has a mean molecular weight of less than 100,000 g/mol.

In another embodiment, the coated paper according to the invention is further preferably characterised in that the at least partly saponified polyvinyl alcohol and/or the at least partly saponified polyvinyl alcohol copolymer has a mean molecular weight of greater than 30,000 g/mol or of greater than 40,000 g/mol or of greater than 50,000 g/mol or of greater than 60,000 g/mol or of greater than 70,000 g/mol.

In one embodiment, the coated paper according to the invention is further preferably characterised in that the at least partly saponified polyvinyl alcohol and/or the at least partly saponified polyvinyl alcohol copolymer has a degree of saponification of from 30% to 100%.

In another embodiment, the coated paper according to the invention is further preferably characterised in that the at least partly saponified polyvinyl alcohol and/or the at least partly saponified polyvinyl alcohol copolymer has a degree of saponification of from 30% to less than 100%.

In another embodiment, the coated paper according to the invention is further preferably characterised in that the at least partly saponified polyvinyl alcohol and/or the at least partly saponified polyvinyl alcohol copolymer has a degree of saponification of less than 95% or of from 30% to 95%.

In another embodiment, the coated paper according to the invention is further preferably characterised in that the at least partly saponified polyvinyl alcohol and/or the at least partly saponified polyvinyl alcohol copolymer has a degree of saponification of from 95% to 100%.

In another embodiment, the coated paper according to the invention is further preferably characterised in that the at least partly saponified polyvinyl alcohol and/or the at least partly saponified polyvinyl alcohol copolymer has a degree of saponification of from 95% to less than 100%.

In another embodiment, the coated paper according to the invention is further preferably characterised in that the at least partly saponified polyvinyl alcohol and/or the at least partly saponified polyvinyl alcohol copolymer has an onset temperature of less than 200° C. determined by DSC.

The coated paper according to the invention is further preferably characterised in that the at least one polymer comprises a partly saponified polyvinyl alcohol with a degree of saponification of less than 95% or of from 30% to 95%, a mean molecular weight of greater than 0 and less than 100,000 g/mol, and an onset temperature of less than 200° C. determined by DSC.

In another embodiment, the coated paper according to the invention is further preferably characterised in that the at least one polymer comprises a partly saponified polyvinyl alcohol with a degree of saponification of from 95% to 100%, a mean molecular weight of greater than 70,000 g/mol, and an onset temperature of less than 200° C. determined by DSC.

In another embodiment, the coated paper according to the invention is further preferably characterised in that the at least one polymer comprises a partly saponified polyvinyl alcohol copolymer, preferably a partly saponified polyethylene vinyl alcohol, with a degree of saponification of from 95% to 100%, a mean molecular weight of greater than 60,000 g/mol, and an onset temperature of less than 210° C. determined by DSC.

It has been shown that a partly saponified polyvinyl alcohol copolymer such as polyethylene vinyl alcohol is usually more flexible than a polyvinyl alcohol.

In another embodiment, the coated paper according to the invention is preferably characterised in that the at least one polymer is a mixture of a partly saponified polyvinyl alcohol with a degree of saponification of from 1% to 95%, a mean molecular weight of greater than 0 and less than 100,000 g/mol, and an onset temperature of less than 200° C. determined by DSC, a partly saponified polyvinyl alcohol with a degree of saponification of 95% to 100%, a mean molecular weight of greater than 70.000 g/mol, and an onset temperature of less than 200° C. determined by DSC, and/or a partly saponified polyvinyl alcohol copolymer, preferably a partly saponified polyethylene vinyl alcohol, with a degree of saponification of 95% to 100%, a mean molecular weight of greater than 60,000 g/mol, and an onset temperature of less than 210° C. determined by DSC.

The degree of saponification was determined according to DIN EN ISO 3681 as follows:

PVOH (1 g) is mixed with dist. water (70 mL) and neutralised ethanol (30 mL) and heated under reflux until completely dissolved. After cooling down, the solution is neutralised with caustic potash solution (0.1 M). In the case of partly saponified PVOH types, further caustic potash solution (50 mL, 0.1 M) is added and heated under reflux (60 min.). In the case of fully saponified PVOH types, a reduced amount of further caustic potash solution (25 mL, 0.1 M) is used to prevent the absorption of carbon dioxide in the potash excess, with a likewise reduced reflux time (30 min.). Subsequently, the potash excess is back-titrated with hydrochloric acid (0.1 M) against phenolphthalein as an indicator. A blind test is carried out in parallel.

The degree of saponification (%) can be calculated according to Eq. 1:

$$\text{degree of saponification (\%)} = \frac{(100 - 0.1535) \times \text{ester number}}{(100 - 0.0749) \times \text{ester number}} \times 100 \quad \text{(Eq. 1)}$$

the ester number being determined according to Eq. 2:

$$\text{ester number (mg } KOH/g) = \frac{(\text{consumption } KOH_{PVOH}(\text{mg}) - \text{consumption } KOH_{blind\ value}(\text{mg})) \times 5.61}{\text{oven-dried weight (g)}} \times 100 \quad \text{(Eq. 2)}$$

The mean molecular weights were determined by size exclusion chromatography (GPC) under the following conditions:
  eluent: DMSO/+ 0.1 M LiCl; precolumn: 10 µm, Guard, ID 8.00 mm×50.00 mm; columns: 10 µm, 30 Å, ID 8.00 mm×300.00 mm; 10 µm, 3000 Å, ID 8.00 mm×300.00 mm; 10 µm, 3000 Å, ID 8.00 mm×300.00 mm; pump: 1260 HPLC-pump; flow rate: 1.0 mL/min; injector: 1260 autosampler; injection volume: 200 µL; sample concentration: 5.0 g/L; temperature: 80° C.; detectors: SECcurity$^2$ refractive index detector (RI)-WEG eta 1001 HT viscometer; calculation: WinGPC UniChrom version 8.33

The samples were dissolved in solvent (5 mg/mL) at a temperature of 80° C. for three hours and injected by Autosampler.

To determine the calibration curve, some PMMA standards with different molecular weights were measured. By measuring the intrinsic viscosity, the calibration curve was converted into a universal calibration curve.

The coated paper according to the invention is further preferably characterised in that the polyvinyl alcohol at a dry content of 4% has a viscosity of less than 30 mPa*s or less than 20 mPa*s, especially preferably less than 15 mPa*s.

The viscosity is determined at 23° C. with a Brookfield viscometer at 100 rpm.

A viscosity in this range has the advantage that higher solids contents can be used in the application and therefore less energy has to be used for drying; in addition, higher process speeds can be achieved. In addition to a financial advantage, this is also reflected in the use of a larger drying window in coating facilities.

The coated paper according to the invention preferably has a breaking strength of >80 N15 mm, preferably >90 N15 mm in the running direction, and >40 N15 mm, preferably >50 N15 mm transverse to the running direction of the paper.

The coated paper according to the invention further preferably has a dynamic coefficient of friction of <0.7, preferably <0.6, especially preferably <0.5. This refers to the friction of the coated side on the coated side (coating against coating).

The coated paper according to the invention is further preferably characterised in that the applied area density of the barrier layer is from 5 to 20 g/m$^2$, preferably from 8 to 12 g/m$^2$, in relation to the dried end product (air-dried).

The coated paper according to the invention is further preferably characterised in that the barrier layer can be wetted with common water-based cold seal adhesives. For this purpose, the surface energy of the barrier coating is >40 mN/m, preferably >50 mN/m, especially preferably >55 mN/m.

Such wettability of the barrier layer has the advantage that no uncoated areas form during the application and drying process of cold seal adhesives and that sufficient adhesion is also provided for the application.

The coated paper according to the invention is further preferably characterised in that the coated paper has an oxygen permeability $cm^3/m^2/d$ (23° C., 0% relative humidity) of less than 10, preferably of less than 5.

The coated paper according to the invention is further preferably characterised in that the coated paper has an oxygen permeability $cm^3/m^2/d$ (23° C., 50% relative humidity) of less than 10, preferably of less than 5.

The coated paper according to the invention is further preferably characterised in that the coated paper has an oxygen permeability $g/m^2/d$ (23° C., 70% relative humidity) of less than 20, preferably of less than 10.

The coated paper according to the invention is further preferably characterised in that the coated paper has an oxygen permeability $g/m^2/d$ (23° C., 80% relative humidity) of less than 25, preferably of less than 15.

The oxygen permeability (or also oxygen transmission rate—OTR) is determined according to ISO 15105-2.

The coated paper according to the invention is further preferably characterised in that the coated paper has a grease barrier corresponding to test condition I according to DIN 53116.

The coated paper according to the invention preferably also does not lose this grease barrier through the mechanical stress of 180° creasing with a roller which exerts a load of 330 g/cm on the resulting crease and in which the coating can be on the inside (inner crease) or outside (outer crease).

The coated paper according to the invention is further preferably characterised in that the coated paper has a mineral oil barrier (hexane) of <10 $g/m^2/d$.

The mineral oil barrier is determined by pouring hexane into a beaker (solvent-resistant), sealing it tightly with the coated paper, and following the decrease in weight over time.

The coated paper according to the invention is further preferably characterised in that the coated paper has a water vapour barrier. This is maintained even when the coating comes into contact with grease, which is not the case for all water vapour barriers.

The coated paper according to the invention is further preferably characterised in that it is crease-resistant in the uncreased state, in the inner crease and also in the outer crease.

The coated paper according to the invention is distinguished by recyclability via the waste paper cycle.

The coated paper according to the invention is heat-sealable and at the optimal sealing temperature preferably gives a sealing seam strength of >3.5 N/15 mm, especially preferably >5.0 N/15 mm, the sealing seam strength for the coated paper having been determined as follows:

The coated paper was sealed at 3.3 bar for 0.3 sec. in the temperature range of from 100° C. to 230° C. transverse to the running direction of the paper, and the sealing seam strength was determined according to DIN 55529 (2012).

The term "heat sealing" is preferably understood to mean the joining of two layers of the coated paper by means of local heat input and/or pressure. In further embodiments, the coated side of the paper can also be joined to an opposite side of the paper not heat-sealable per se or to another paper by heat-sealing.

Furthermore, the coated paper according to the invention is also cold-sealable due to its compatibility with common cold-sealing media. Cold-sealing is generally understood to mean that a cold-seal adhesive is applied to the portion of a flat packaging material to be sealed by pressure-based processes. A cold-seal adhesive has the property that it only develops an adhesive effect under and after increased pressure between sealing jaws of a packaging machine and otherwise has no or only limited tack.

Both the heat-sealed paper and the cold-sealed paper are distinguished by a high moisture resistance of the sealing seam.

The coated paper according to the invention is also tear-resistant.

The coated paper according to the invention is further distinguished in that the taste of foodstuffs packaged therein is not affected.

The coated paper according to the invention can also be metallised in the nanometre range, for example with $Al_2O_3$ or Al.

The coated paper according to the invention is further preferably characterised in that a further layer comprising metals, especially aluminium, and/or metal oxides, especially aluminium oxide and/or silicon oxide, is applied to the barrier layer.

The coated paper according to the invention can be economically obtained using known production methods.

However, it is preferred to obtain the coated paper according to the invention by a method in which an aqueous suspension comprising the starting materials of the barrier layer is applied to the base paper, the aqueous application suspension having a solids content of from 5 to 50% by weight, preferably from 10 to 30% by weight, and being applied by a curtain coating process, preferably a double curtain coating process, at an operating speed of the coating facility of at least 200 m/min.

This method is especially advantageous from an economic point of view and due to the even application over the paper web.

If the value of the solids content falls below about 10% by weight, then the economic efficiency deteriorates, since a large amount of water has to be removed by gentle drying in a short space of time, which has a detrimental effect on the coating speed. On the other hand, if the value of 50% by weight is exceeded, then this only leads to an increased technical effort to ensure the stability of the coating curtain material during the coating process and the drying of the applied film, since the machine has to run very quickly again in this case.

In the curtain coating method, a free-falling curtain of coating dispersion is formed. The coating dispersion, which is in the form of a thin film (curtain), is "poured" by free fall onto a substrate in order to apply the coating dispersion to the substrate. Document DE 10 196 052 T1 discloses the use of the curtain coating method in the production of information recording materials, where multi-layer recording layers are realised by applying the curtain, consisting of a plurality of coating dispersion films, to substrates.

In a preferred embodiment of the method according to the invention, the aqueous deaerated coating suspension has a viscosity of about 100 to about 800 mPa*s (Brookfield, 100 rpm, 20° C.). If the viscosity falls below the value of about 100 mPa*s or exceeds the value of about 800 mPa*s, this causes the coating composition to run poorly through the coating unit. Especially preferably, the viscosity of the aqueous deaerated coating suspension is about 200 to about 500 mPa*s.

In a preferred embodiment, the surface tension of the aqueous coating suspension can be adjusted to about 25 to about 70 mN/m, preferably to about 35 to about 60 mN/m (measured according to the standard for bubble pressure tensiometry (ASTM D 3825-90), as described below), to optimise the process. Better control over the coating process is obtained by determining the dynamic surface tension of the coating material and adjusting it in a targeted manner by selecting the appropriate surfactant and by determining the required amount of surfactant.

It has been shown that polyvinyl alcohol solutions require significantly less surfactant to generate an identical surface tension compared to dispersions, especially those with a small particle size and thus high particle surface area.

The dynamic surface tension is measured by means of a bubble pressure tensiometer. The maximum internal pressure of a gas bubble formed via a capillary in a liquid is measured. The internal pressure p of a spherical gas bubble (Laplace pressure) depends on the radius of curvature r and the surface tension a according to the Young-Laplace equation:

$$p = \frac{2\sigma}{r}$$

If a gas bubble is created at the tip of a capillary in a liquid, the curvature first increases and then decreases again, resulting in a pressure maximum. The greatest curvature and thus the greatest pressure occur when the radius of curvature is equal to the capillary radius.

Pressure curve during bubble pressure measurement, position of the pressure maximum:

The radius of the capillary is determined with a reference measurement, which is carried out with a liquid of known surface tension, usually water. If the radius is then known, the surface tension can be calculated from the pressure maximum pmax. Since the capillary is immersed in the liquid, the hydrostatic pressure p0, which results from the immersion depth and the density of the liquid, must be subtracted from the measured pressure (this is done automatically in the case of modern measuring instruments). This results in the following formula for the bubble pressure method:

$$\sigma = \frac{(p_{max} - p_0) \cdot r}{2}$$

The measured value corresponds to the surface tension at a certain surface age, the time from the beginning of bubble formation to the occurrence of the pressure maximum. By varying the speed at which the bubbles are generated, the dependence of the surface tension on the surface age can be recorded, resulting in a curve in which the surface tension is plotted over time.

This dependence plays an important role for the use of surfactants, since the equilibrium value of the interfacial tension is not reached at all in many processes due to the sometimes low diffusion rates and adsorption rates of surfactants.

The individual coatings can be formed on-line on a paper machine with coating unit or in a separate coating process off-line on a coating machine.

In further embodiments, the individual layers can also be applied to the base paper using the following methods:

The barrier layer can be applied to the base paper and/or to pre-existing precoats by means of printing methods.

The barrier layer can be applied by extrusion to the base paper and/or to pre-existing precoats.

This technique has the advantage that significantly more material can be applied, but this is only of interest if the overall product does not need to be recyclable as paper. Disadvantages, on the other hand, are lower application speeds, higher energy consumption, and a higher minimum application weight.

The barrier layer can be applied by laminating paper, for example in the form of plastics material films applied to the base paper and/or to pre-existing precoats.

The barrier layer and the precoat can also be applied consecutively over multiple application steps.

The present invention further relates to a coated paper obtainable by the methods described above.

Due to its comparatively high polarity, the barrier layer is also suitable for applying further barriers in the form of aqueous polymer solutions or dispersions, by melt extrusion, or lamination with films.

The barrier layer can be improved in respect of all barriers, if necessary, by applying an ultra-thin metal layer, metal oxide layer, or other inorganic compound by vapour deposition or, especially, vacuum vapour deposition. Such thin barrier layers are only effective if they adhere to a very smooth, flexible substrate that does not contain particles (for example inorganic pigments) and can form a closed layer thereon. The comparatively high surface energy of the barrier layer, especially that of the comprehensive polymers, favours the layer adhesion of polar materials such as metal oxides and other inorganic oxides, as well as polarisable electrically conductive materials such as metals. The papers obtained in this way can in turn be made sealable by applying a heat-sealing layer or a cold-seal adhesive.

The present invention also relates to the use of a coated paper as described above or of a coated paper obtainable by the method described above as a packaging material.

Lastly, the present invention also relates to the use of a coated paper as described above or of a coated paper obtainable by the method described above as a packaging material for foodstuffs, especially for greasy and oxidation-sensitive foodstuffs.

The present invention further preferably relates to the use of a coated paper as described above or of a coated paper obtainable by the method described above as a packaging material for, for example, cereal bars, chocolate, chocolate-containing products, or crisps.

In a further preferred embodiment of the invention, the coated paper according to the invention is applied to cardboard or paperboard, especially by lamination or bonding.

Lastly, the present invention also relates to the use of a composite in which a coated paper according to the invention is applied to cardboard or paperboard, especially by lamination or bonding, as a packaging material for foodstuffs, especially for greasy and oxidation-sensitive foodstuffs.

In this way, packaging materials can be produced in a simple and economical way that have the advantages of both material components, such as the increased strength and stiffness of cardboard or paperboard compared to a coated paper and the described advantages of the coated papers. The application can be performed, for example, using starch or aqueous dispersion adhesives.

Preferably, the coated paper can therefore be a component of packaging materials based on cardboard or paperboard.

With these packaging materials according to the invention, heavier foodstuffs especially can be safely packaged and attractively presented to the customer in the form of upright packaging in retail outlets.

These packaging materials preferably have a mass fraction of greater than 95% by weight of the uniform material type paper, cardboard or paperboard. Here, a further advantage of the present invention is that these packaging materials according to the invention are not composite packaging according to § 3 (5) of the German Packaging Act, and thus this embodiment of the present invention contributes significantly to reducing the impact of packaging waste on the environment.

The present invention also relates to a packaging comprising a coated paper as described above or in a composite with cardboard or paperboard as described above.

The features of the use according to the invention apply analogously to the packaging according to the invention.

The packaging may be a cold-sealed packaging. A cold-sealed packaging is preferably suitable for packaging foodstuffs such as chocolate, chocolate-containing products, bars, for example cereal bars, and/or other confectionery products. This is due to the heat sensitivity of chocolate as well as a possible higher machine speed. Packaging machines based on cold sealing can be run faster, since the heating of a heat-sealing medium takes a comparatively long time.

The packaging can also be a heat-sealed packaging. Heat-sealed packaging is preferably suitable for use as secondary packaging or packaging for containers above dosing and filling scales.

The packaging may also be a cold-sealed packaging.

The packaging may further be a form-fill-seal packaging, especially a cold-sealed or cold-sealed form-fill-seal packaging.

The invention is explained in detail below on the basis of non-limiting examples.

EXAMPLES

The following coatings were applied to a 60 g/m² base paper with 40% long fibre and 60% short fibre content.
Precoat/Primer:
The precoat contains 75.9% pigment (phyllosilicate), 22.8% latex (styrene-butadiene latex) and 1.3% rheology modifiers (0.2% acrylate-based thickener, 1.1% zirconium-based cross-linking agent).
Barrier Layer:
In examples 1 to 5 and in comparative example 1, polyvinyl alcohols were used. In examples 6 to 7, polyethylene vinyl alcohols were used.

The barrier layer of examples 1 to 7 and comparative example 1 comprises a pure polymeric coating. Example 1' comprises a polymeric coating with 99.8% polyvinyl alcohol (example 1; degree of saponification: 87%; $M_w$: 50900) and 0.2% rheology modifiers (Na-docusate).

For this purpose, the precoat was applied using a blade. The barrier layer of examples 1 to 7 and of comparative example 1 was applied with a doctor blade; the barrier layer of example 1', in contrast to example 1, was applied with a curtain coater.

The following properties were examined:
Coating weight: Application weight of the barrier coating in g/m². This is determined by differential weighing between coated and uncoated papers.

Viscosity: The viscosity was measured with a Brookfield viscometer, determined at 23° C. and a speed of 100 rpm, at a dry content of 4%.

WVTR: Water vapour transmission rate, determined according to ISO 15106-2.

OTR: Oxygen transmission rate, determined according to DIN 15105-2

HVTR: Hexane vapour transmission rate. Here, n-hexane is filled into a beaker (solvent-resistant), tightly sealed with the test sample, and the decrease in weight is monitored over time. In the case of creased samples, a crease of 180° is created with a roller which exerts a load of 330 g/cm on the resulting crease, it being possible for the coating to be located on the inside (inner crease) or outside (outer crease).

Palm kernel oil test: Analogous to DIN 53116. In the case of creased samples, a 180° crease is created with a roller that exerts a load of 330 g/cm on the resulting crease, it being possible for the crease to located on the inside (inner crease) or outside (outer crease).

Display paper: Evaluation of the display paper mentioned in DIN 53116. Here, grease penetration points with a diameter (d)>1<1 mm are counted.

Sample paper: Evaluation of the rear side of the sample paper mentioned in DIN 53116. This is not part of the standard, but was carried out for improved differentiation.

Sealing seam strength: The samples are sealed at 3.3 bar for 0.3 sec. in the temperature range of from 100° C. to 220° C., transverse to the running direction of the paper, and the sealing seam strength is determined according to DIN 55529 (2012). The optimum sealing temperature and, for comparison, the sealing force at 150° C. (optimum sealing temperature of example 1) are recorded.

DSC melting temperature/onset: The DSC curves were measured with a Mettler DSC 20S in cold-welded aluminium crucibles and perforated lids. The heating rates were 10 K/min in the range between 30° C. and 280° C. The melting temperatures were determined via the peak minima of the melting process.

Surface tension or energy Contact angle measuring device OCA 20 (DataPhysics) with software SCA 20
   Measuring principle: OWRK method (Owens, Wendt, Rabel, Kaelble)
   Measuring liquids used and origin of the material constants entered:
   water and diiodomethane (according to Buscher) and 1,5-pentanediol (according to Gebhardt)

The obtained coated papers were examined. The results are shown in the following table.

|  |  | Ex. 1 | Ex. 1' | Ex. 2 | Ex. 3 | Ex. 4 | Ex. 5 | Ex. 6 | Ex. 7 | Comp. ex. 1 |
|---|---|---|---|---|---|---|---|---|---|---|
| Coating weight | Ø g/m² | 10.3 | 10.0 | 10.4 | 10.1 | 9.7 | 10.1 | 9.1 | 10.3 | 9.7 |
| Viscosity* | mPa*s | 9 | 9 | 26 | 7 | 10 | 9 | 17 | 25 | 8 |
| OTR |  |  |  |  |  |  |  |  |  |  |
| 23.0° C./0% r.h. | g/m²/d | 1.86 | 1.12 | 1.33 | 16.64 | 1.53 | 1.12 | 0.04 | 0.04 | 3.05 |
| HVTR | g/m²/d | <10 | <10 | <10 | <10 | <10 | <10 | <10 | <10 | <10 |

-continued

|  |  | Ex. 1 | Ex. 1' | Ex. 2 | Ex. 3 | Ex. 4 | Ex. 5 | Ex. 6 | Ex. 7 | Comp. ex. 1 |
|---|---|---|---|---|---|---|---|---|---|---|
| Creased (inside) | g/m²/d | <10 | <10 | <10 | <10 | <10 | <10 | <10 | <10 | <10 |
| Creased (outside) | g/m²/d | <10 | <10 | <10 | <10 | <10 | <10 | <10 | <10 | <10 |
| Palm kernel oil test |  |  |  |  |  |  |  |  |  |  |
| Display paper (AP) | d</>1 mm | 0/0 | 0/0 | 0/0 | 0/0 | 0/0 | 0/0 | 0/0 | 1/0 | 0/0 |
| Sample paper (PP) | d</>1 mm | 0/0 | 0/0 | 0/0 | 0/0 | 0/0 | 0/0 | 0/0 | 1/0 | 0/0 |
| AP - inner crease | d</>1 mm | 0/0 | 0/0 | 0/0 | 0/1 | 0/0 | 0/0 | 0/0 | 0/0 | 0/1 |
| PP - inner crease | d</>1 mm | 0/0 | 0/0 | 0/0 | 0.5/0 | 0/0 | 0/0 | 0/0 | 0/0 | 0/1 |
| AP - outer crease | d</>1 mm | 0/0 | 0/0 | 0/0 | 0/0 | 2/0 | 0/0 | 0/0 | 0/0 | 0/0 |
| PP - outer crease | d</>1 mm | 0/0 | 0/0 | 0/0 | 0/0 | 0/2 | 3/0 | 1/10 | 1/0 | 2/12 |
| Cold tack at 150° C. | N/15 mm | 6.9 | 6.7 | 0.7 | 4.5 | 5.0 | 7.2 | 0.0 | 0.0 | 0.6 |
| Opt. sealing temperature | ° C. | 150 | 150 | 200 | 160 | 130-160 | 150 | 190 | 190 | 210 |
| WVTR |  |  |  |  |  |  |  |  |  |  |
| Ambient, 23° C., 50% r.h. | g/m²/d | 8.3 | 7.6 | 12.7 | 26.0 | 9.5 | 16.0 | 1.0 | 1.9 | 8.0 |
| DSC- Melting temp. | ° C. | 195 | 195 | 224 | 189 | 190 | 191 | 218 | 217 | 222 |
| DSC - Onset | ° C. | 178 | 178 | 187 | 158 | 165 | 169 | 203 | 199 | 221 |
| Degree of saponification | % | 87 | 87 | 99 | 85 | 88 | 88 | 99 | 98-99 | 98 |
| Mean molecular mass | g/mol | 50.900 | 50900 | 91.200 | 38.900 | 56.700 |  | 64.700 | 87.900 | 35.000 |
| Surface tension or energy | mN/m | 58.35 |  | 66.73 | 55.93 | 54.06 | 54.98 | 43.73 | 44.27 | 60.26 |

The partly saponified polyvinyl alcohols used have very low hexane and oxygen transmission rates. This is presumably due to their relatively high hydrophilicity.

The polyvinyl alcohols with a higher degree of saponification are distinguished in the coating material by a higher viscosity with the same dry content. From a chemical point of view, this only make's sense since, due to the higher polarity, each molecule interacts more strongly with the surrounding solvent (water).

This is rather disadvantageous, since a large amount of water has to be dried in the coating process at low dry contents. This not only costs in terms of energy, but can also be difficult to realise in terms of application technology, depending on the desired coating weight. In addition, the diffusion of water molecules and thus the drying itself is slowed. Furthermore, this can lead to an accumulation of gaseous water in the coating, which leads to the formation of macroscopic coating defects.

The water vapour permeability of the examined polyethylene vinyl alcohols is lower than that of the polyvinyl alcohols, which is presumably due to the ethylene content and the associated lower hydrophilicity.

In general, fully saponified PVOHs should be more brittle than partly saponified PVOHs because of the greater number of hydrogen bonds that they can form. This also applies to comparative example 1 (see palm kernel oil test).

This has not yet been proven for example 2. The reason for this is assumed to be the higher molecular weight. It has already been shown for polyvinyl alcohol fibres (e.g. Gotoh et al., Polymer Journal, vol. 32, no. 12 (2000), pp. 1049-1051: "Molecular Weight Dependence of Tensile Properties in Poly(vinyl alcohol) Fibers") that different molecular weights among otherwise identical polyvinyl alcohols have an immense influence on their physical properties. For example, the elongation at break of higher-weight polyvinyl alcohols is lower, but the force required for this is many times higher.

The invention claimed is:

1. Packaging comprising a coated paper for packaging food stuffs, wherein the coated paper comprising a base paper and a barrier layer applied thereto, the barrier layer comprising at least one polymer, characterised in that the polymer comprises an at least partly saponified polyvinyl alcohol and/or an at least partly saponified polyvinyl alcohol copolymer, each of which has an onset temperature of less than 210° C. determined by DSC, the onset temperature being defined by DSC according to DIN EN ISO 11357-1: 2010-03 as the point of intersection of the extrapolated baseline and the inflection tangent at the beginning of the melting or crystallisation peak, wherein a precoat comprising at least one inorganic pigment and a polymeric binder is present between the base paper and the barrier layer, wherein the inorganic pigment is in the form of platelets selected from the group of talc, precipitated calcium carbonate, silicate, phyllosilicate and kaolin, and/or the polymeric binder comprises a polymeric binder selected from the group of acrylate-based binder, styrene/butadiene-based binder, starch-based binder, modified starch, dispersion of cross-linked starch, biolatex, and polymer-starch hybrid latices, and wherein the at least partly saponified polyvinyl alcohol and/or the at least partly saponified polyvinyl alcohol copolymer has a degree of saponification of from 30% to 100%.

2. The packaging according to claim 1, characterised in that the at least one polymer comprises a partly saponified polyvinyl alcohol with a degree of saponification of from 30% to 95%, a mean molecular weight of greater than 0 and less than 100,000 g/mol, and with an onset temperature of less than 200° C. determined by DSC.

3. The packaging according to claim 1, characterised in that the at least one polymer comprises a partly saponified polyvinyl alcohol with a degree of saponification of greater than 95% to 100%, a mean molecular weight of greater than 70,000 g/mol, and with an onset temperature of less than 200° C. determined by DSC.

4. The packaging according to claim 1, characterised in that the at least one polymer comprises a partly saponified polyvinyl alcohol copolymer, with a degree of saponification of from 95% to 100%, a mean molecular weight of greater than 60,000 g/mol, and with an onset temperature of less than 210° C. determined by DSC.

5. The packaging according to claim 1, characterised in that the at least one polymer comprises a mixture of a partly saponified polyvinyl alcohol with a degree of saponification of from 30% to 95%, a mean molecular weight of greater than 0 and less than 100,000 g/mol, and with an onset temperature of less than 200° C. determined by DSC; a partly saponified polyvinyl alcohol with a degree of saponification of greater than 95% to 100%, a mean molecular weight of greater than 70,000 g/mol, and with an onset temperature of less than 200° C. determined by DSC; and a partly saponified polyvinyl alcohol copolymer with a degree of saponification of from 95% to 100%, a mean molecular weight of greater than 60,000 g/mol, and with an onset temperature of less than 210° C. determined by DSC.

6. The packaging according to claim 1, characterised in that the partly saponified polyvinyl alcohol and/or the partly saponified polyvinyl alcohol copolymer at a dry content of 4% has a viscosity of less than 30 mPa*s.

7. The packaging according to claim 1, characterised in that the applied area density of the barrier layer is from 5 to 20 g/m², in relation to the dried end product (air-dried).

8. The packaging according to claim 1, characterised in that the coated paper is free of halogen-containing compounds.

9. The packaging according to claim 1, characterised in that the base paper has an area density of from 20 to 120 g/m².

10. The packaging according to claim 1, characterised in that the base paper has a long fibre content of from 10 to 80% and a short fibre content of from 20 to 90% by weight, a long fibre being a fibre that has a fibre length of from 2.6 to 4.4 mm and a short fibre being a fibre that has a fibre length of from 0.7 to 2.2 mm.

11. The packaging according to claim 1, characterised in that a further layer comprising aluminum, and/or metal oxides is applied to the barrier layer.

12. A method for producing the packaging according to claim 1, characterised in that an aqueous suspension comprising the starting materials of the barrier layer is applied to the base paper, said aqueous application suspension having a solids content of from 5 to 50% by weight, and is applied by a curtain coating process, preferably by a double curtain coating process, at an operating speed of the coating facility of at least 200 m/min.

13. The packaging according to claim 1, wherein the packaging is a cold-sealed packaging, a heat-sealed packaging, or a form-fill-seal packaging.

14. The packaging according to claim 1, characterised in that the inorganic pigment is in the form of talc platelets, a precipitated calcium carbonate, a kaolin silicate, and/or in that the polymeric binder comprises a polymeric binder based on a polyacrylate.

15. The packaging according to claim 1, characterised in that the at least one polymer comprises a partly saponified polyethylene vinyl alcohol with a degree of saponification of from 95% to 100%, a mean molecular weight of greater than 60,000 g/mol, and with an onset temperature of less than 2100C determined by DSC.

16. The packaging according to claim 1, characterised in that the partly saponified polyvinyl alcohol and/or the partly saponified polyvinyl alcohol copolymer at a dry content of 4% has a viscosity of less than 15 mPa*s.

17. The packaging according to claim 1, characterised in that the applied area density of the barrier layer is from 8 to 12 g/m² in relation to the dried end product (air-dried).

18. Packaging comprising a coated paper for packaging food stuffs, wherein the coated paper comprising a base paper and a barrier layer applied thereto, the barrier layer comprising primarily one polymer, characterised in that the one polymer comprises an at least partly saponified polyvinyl alcohol and/or an at least partly saponified polyvinyl alcohol copolymer, each of which has an onset temperature of less than 210° C. determined by DSC, the onset temperature being defined by DSC according to DIN EN ISO 11357-1:2010-03 as the point of intersection of the extrapolated baseline and the inflection tangent at the beginning of the melting or crystallisation peak, wherein a precoat comprising at least one inorganic pigment and a polymeric binder is present between the base paper and the barrier layer, wherein the inorganic pigment is in the form of platelets selected from the group of talc, precipitated calcium carbonate, silicate, phyllosilicate and kaolin, and/or the polymeric binder comprises a polymeric binder selected from the group of acrylate-based binder, styrene/butadiene-based binder, starch-based binder, modified starch, dispersion of cross-linked starch, biolatex, and polymer-starch hybrid latices, and wherein the at least partly saponified polyvinyl alcohol and/or the at least partly saponified polyvinyl alcohol copolymer has a degree of saponification of from 30% to 100%.

* * * * *